(No Model.) 4 Sheets—Sheet 1.
E. B. HESS & J. M. STOUGHTON.
CASH REGISTER AND INDICATOR.
No. 597,676. Patented Jan. 18, 1898.
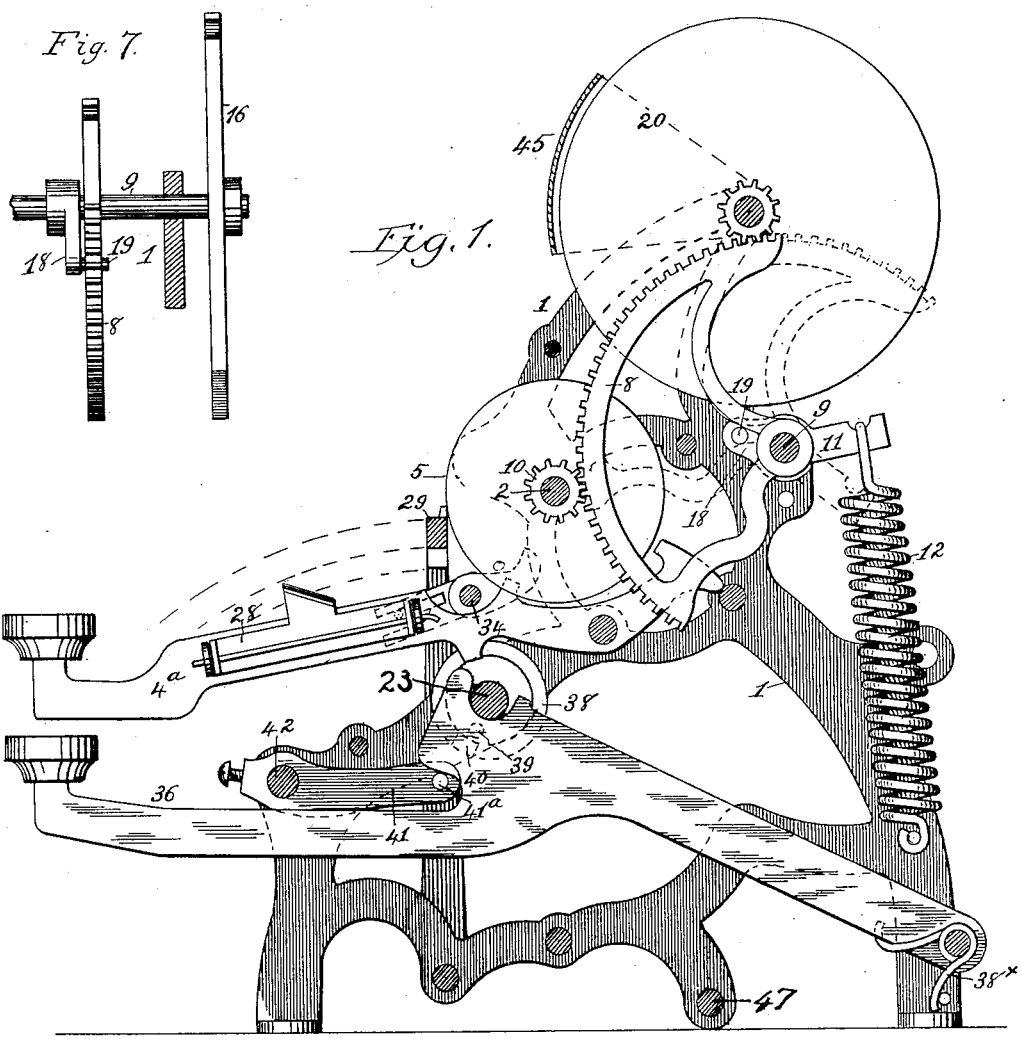
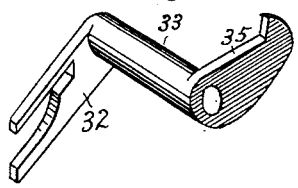
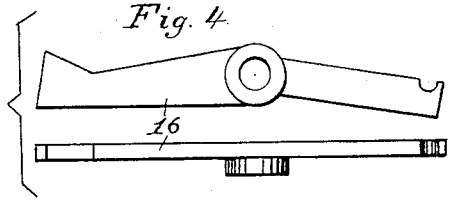
WITNESSES
L. D. Heinrichs
Harry S. Rohrer
E. B. Hess
J. M. Stoughton
INVENTORS.
By D. B. Gallatin
Attorney.

(No Model.) 4 Sheets—Sheet 2.
E. B. HESS & J. M. STOUGHTON.
CASH REGISTER AND INDICATOR.
No. 597,676. Patented Jan. 18, 1898.
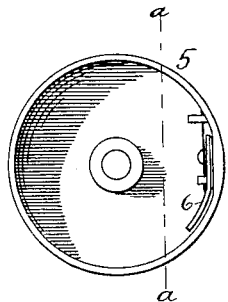
Fig. 8.
on line a-a. Fig. 2.
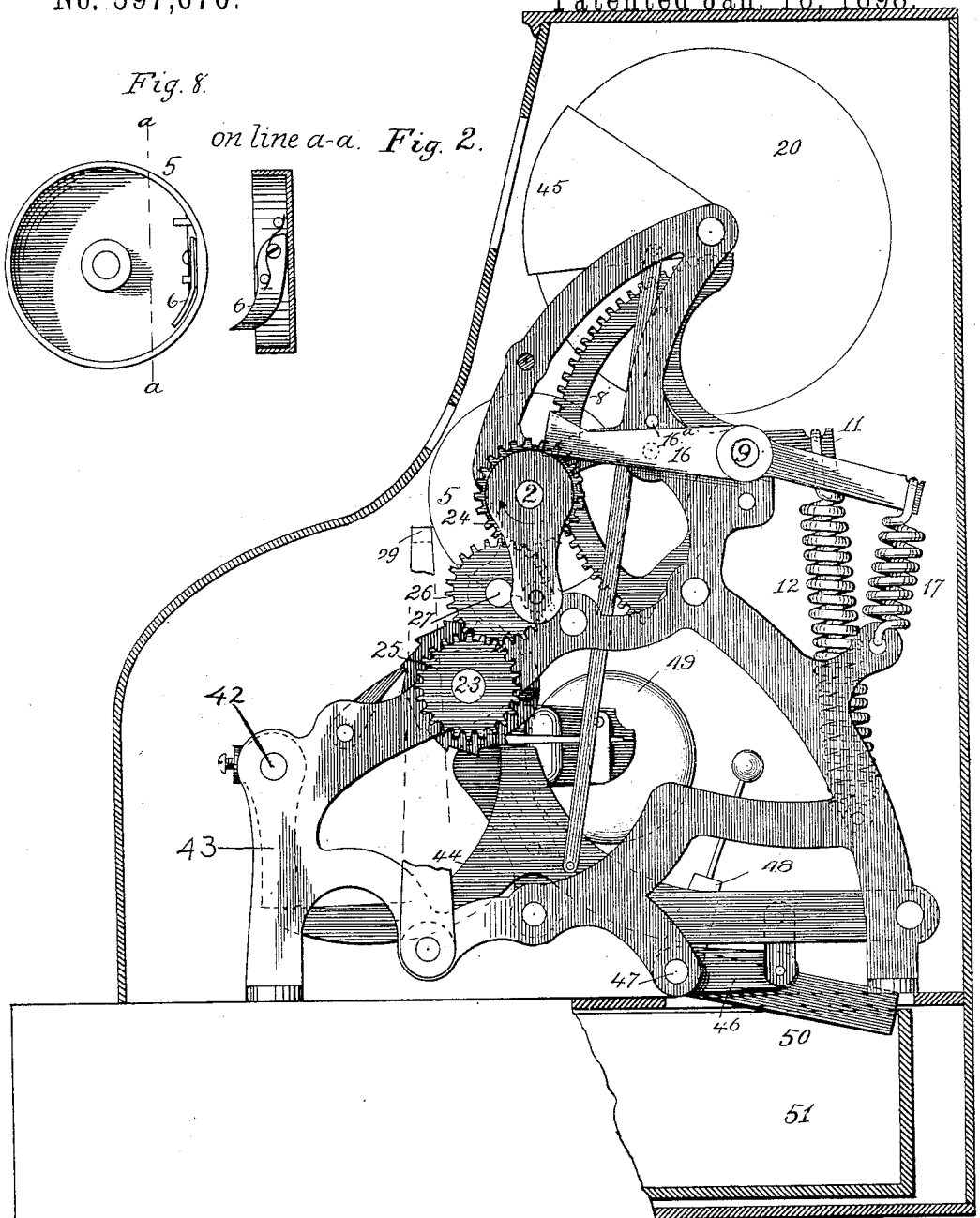
WITNESSES
L. D. Hinrichs
Harry S. Rohrer
E. B. Hess.
J. M. Stoughton.
INVENTORS.
By D. B. Gallatin,
Attorney.
THE NORRIS PETERS CO., PHOTO-LITHO., WASHINGTON, D. C.

(No Model.)
4 Sheets—Sheet 3.
E. B. HESS & J. M. STOUGHTON.
CASH REGISTER AND INDICATOR.
No. 597,676. Patented Jan. 18, 1898.
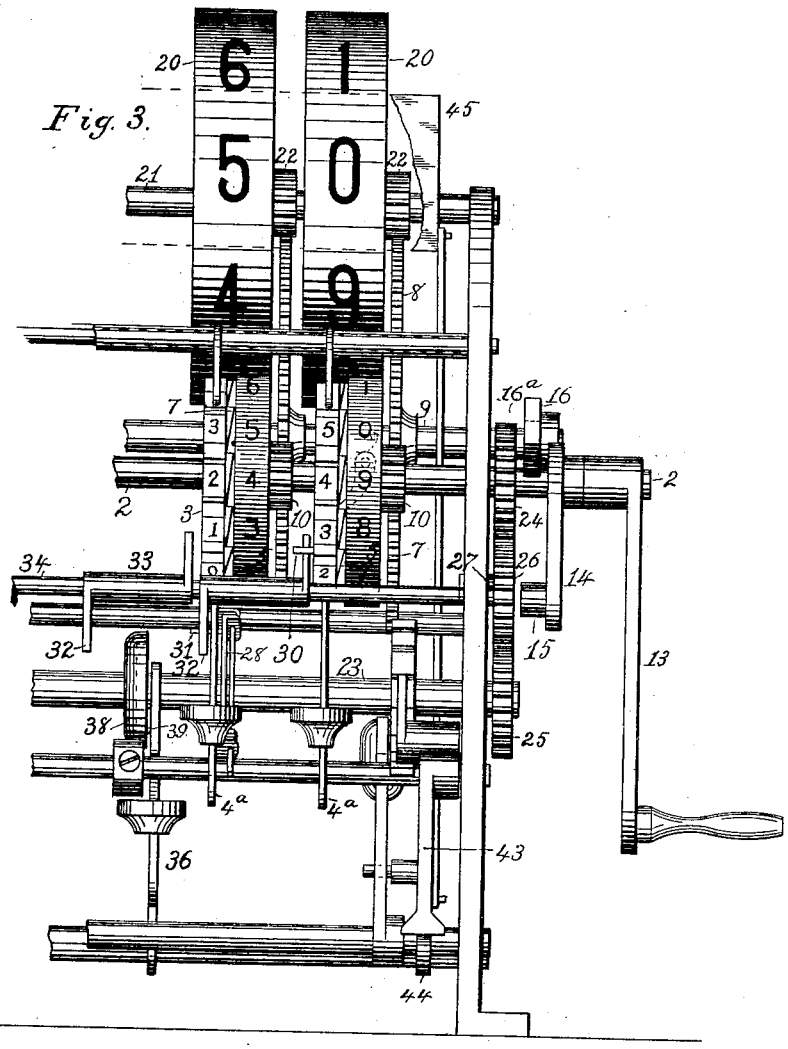
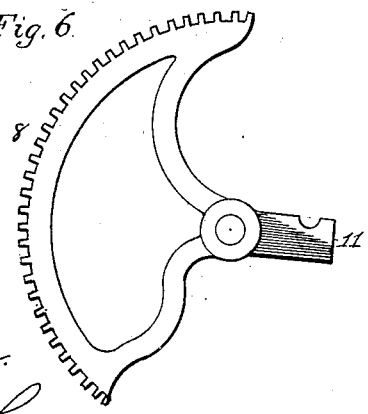
WITNESSES
L. D. Hinrichs.
Harry S. Rohrer.
E. B. Hess,
J. M. Stoughton,
INVENTORS
By D. B. Gallatin
Attorney (No Model.) 4 Sheets—Sheet 4.

E. B. HESS & J. M. STOUGHTON.
CASH REGISTER AND INDICATOR

No. 597,676. Patented Jan. 18, 1898.

WITNESSES:

E. B. Hess,
J. M. Stoughton,
INVENTORS;

BY
D. B. Gallatin,
ATTORNEY.

UNITED STATES PATENT OFFICE.

EDWARD B. HESS, OF NEW YORK, AND JOSEPH M. STOUGHTON, OF YONKERS, NEW YORK, ASSIGNORS TO THE METROPOLITAN REGISTER COMPANY, OF NEW YORK, N. Y.

CASH REGISTER AND INDICATOR.

SPECIFICATION forming part of Letters Patent No. 597,676, dated January 18, 1898.

Application filed June 26, 1896. Serial No. 597,049. (No model.)

*To all whom it may concern:*

Be it known that we, EDWARD B. HESS, residing at New York, in the county of New York, and JOSEPH M. STOUGHTON, residing at Yonkers, in the county of Westchester, State of New York, citizens of the United States, have invented certain new and useful Improvements in Cash Registers and Indicators; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines of the type shown and described in Letters Patent of the United States No. 552,463, granted on the 31st day of December, 1895, to the Metropolitan Register Company, of New York, as assignee of John B. Benton and Edward B. Hess; and it has special reference to the means for actuating the register and indicator wheels, to the means for resetting the indicators to zero after the machine has been operated to set up an indication and register the same, and to the means for setting into operative condition the transfer mechanism whereby the tens are transferred or "carried" from one register-wheel to the next wheel of higher order.

It also comprehends minor improvements, which will be hereinafter pointed out.

Figure 9:
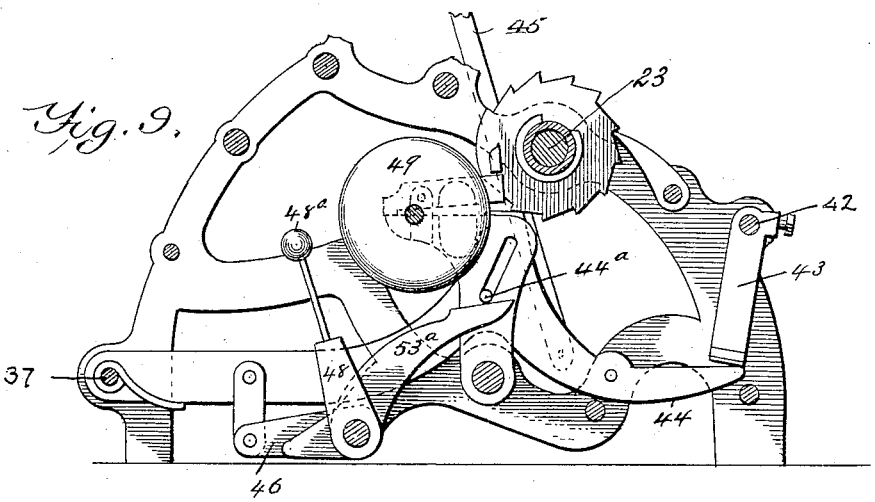
Figure 10:
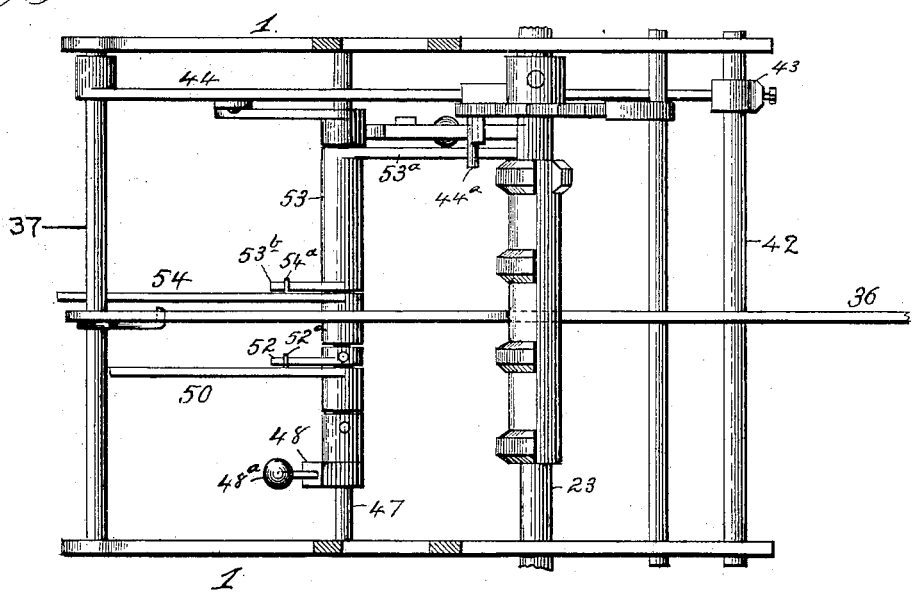

In the accompanying drawings, which illustrate our invention and form a part of this specification, Figure 1 is a vertical section taken centrally through the machine from front to rear, the view being taken toward the left. Fig. 2 represents a side view of the machine with the crank-handle removed. Fig. 3 represents a broken front view of so much of the machine as is necessary to illustrate this invention. Figs. 4, 5, 6, 7, and 8 are detail views of parts hereinafter fully described. Fig. 9 is a sectional view from front to rear through the lower part of the machine, looking from left to right; and Fig. 10 is a plan view of the mechanism shown in Fig. 9.

Referring now to the drawings, 1 1 designate the end standards, which, with the transverse shafts and rods that bind them together, constitute the frame of the machine.

Loosely mounted on a revoluble shaft 2 is a series of register-wheels 3, each formed with ten radial teeth, which wheels are controlled by manually-operated anchor-escapements 4 to give step-by-step movements under the influence of driving mechanism, to be hereinafter described.

At the side of each register-wheel, in close relation thereto and on the same shaft therewith, is an indicator-wheel 5, also loosely mounted and adapted to turn in either direction independently of the shaft. Each of these wheels 5 carries a laterally-swinging spring-pawl 6, arranged and adapted to engage ratchet-teeth 7, formed on the side of the adjacent register-wheel, said teeth pointing in a direction opposite to that in which the wheels move in making a registration. The driving mechanism being applied to the indicator-wheels 5 it follows that when the latter turn in a forward direction they carry along the register-wheels 3, but when turning backward they move independently. The driving mechanism referred to comprehends a segment-gear 8, one for each indicator-wheel, loosely mounted on a shaft 9, extending across the machine in rear of the shaft 2. These segment-gears mesh with pinions 10, formed on or firmly connected with the respective indicator-wheels 5, and they are each formed with a rearwardly-extending arm 11, to which a spring 12 is applied to throw them upward and backward.

The shaft 2 is provided with a crank 13, whereby it is adapted to be turned by the operator, and it has also fast thereon an arm 14, at the outer end of which is a lateral projection (preferably an antifriction-roller) 15.

The shaft 9 has fast on it a lever 16, the front end of which is normally held up against a stop $16^a$ by a spring 17. The front end of this lever projects into the path of the projection 15, and its length is such that said projection after depressing it during the revolution of shaft 2 passes the end and releases it, whereupon it is thrown back to normal position by its spring 17, thus imparting oscillatory motion to shaft 9 during each rotation of shaft 2.

The shaft 9 is provided with a series of short arms 18, one for each segment-gear, fast thereon, having laterally-projecting pins or studs 19, which overlie arms of the respective segment-gears, the arrangement being such that when the shaft 9 is turned forward by the depression of lever 16, as above explained, the segment-gears are thrown forward and their springs 12 put under tension. This forward movement of the segments turns the indicator-wheels 5 backward to the zero position, where they are held by their pawls 6, engaging the ratchet-teeth 7 of the register-wheels 3, the latter being held against rotation by their respective escapements 4. The springs 12 then being under tension supply the motive power for driving the indicator and register wheels when the escapements 4 are manipulated by depressing their arms $4^a$, which constitute the key-levers of the machine.

The indicator-wheels 5 are for the use and convenience of the operator to enable him (or her) to note the operation of the machine and to determine when the proper amount has been set up, as fully set forth in the patent referred to. For the purpose of indicating to the purchaser or others in the establishment the amount set up for a sale or transaction a second series of indicators of relatively large size is provided. These (marked 20 in the drawings) are loosely mounted on a rod 21 above and in rear of the shaft 2. They are also each provided with a pinion 22, fast on the side thereof, which pinions are of the same size as those on the lower indicators 5. The segment-gears 8 are in mesh with the pinions of corresponding wheels in the upper and lower series, so that they impart synchronous movements thereto, and by reason of the pinions 10 and 22 being of uniform size the upper and lower wheels move through equal angular distances, so that corresponding indications are always given by corresponding wheels of the two series.

23 is a rotatable shaft, which in the former patent referred to is denominated the "main" shaft, and is shown and described as having the crank by which the machine is operated applied thereto. The main functions of this shaft, except as hereinafter pointed out, are the same in this present case as in the former patent, and the mechanisms through which such functions are performed forming no part of the present invention they are not herein shown or described.

As above stated and as shown in the accompanying drawings, the crank or crank-handle is now applied to the shaft 2 and the main shaft operated therefrom through gears 24 25 26. The gears 24 25 are of the same size and are fast on the shafts 2 and 23, respectively, motion being transmitted from one to the other through the intermediate gear 26, which is mounted on an arbor 27, projecting from one of the frame-standards. This intermediate gear may be of any size; but, as shown in the drawings, it is of substantially the same size as the other two. Trip-plates 28 are pivotally mounted on the sides of all the key-levers $4^a$ except that at the right hand, which controls the right-hand or lowest register-wheel. These trip-plates are mounted to swing laterally into the paths of depending lugs on a movable bar or yoke 29, so that when the latter is moved forward over the key-levers it will depress those whose trip-plates have been previously set or adjusted.

Each trip-plate is set by a pin 30, projecting laterally from the side of the adjacent register-wheel at the right, the said pins being so arranged with reference to the numerals on the wheels that they will trip the plates at the completion of each full rotation—that is to say, during the movement from the highest registering position to the lowest or zero position, which is the tenth forward step in each rotation. Then when the crank is turned to reset the indicator-wheels the bar or yoke 29 is thrown forward by a cam (not shown) on the shaft 23, as fully shown and described in the former patent referred to, whereby the key-levers whose plates have been set will be depressed and the register-wheels controlled thereby allowed to advance one step and take up the tenth unit of the next wheel of lower order. For fuller elucidation of this carrying operation reference may be had to said prior patent.

In the construction and arrangement shown and described in the former patent the trip-plates were provided with rearwardly and laterally extending arms, which when the plates stood in vertical position projected into the paths of the pins 30, so that when the pins struck said arms the latter were depressed and the plates rocked laterally into the paths of the depending lugs on the bar or yoke 29. For reasons not necessary to be stated here this construction and arrangement were found objectionable, and therefore in the present case the trip-plates are provided with pins or arms 31, which project over or under, but preferably through, openings provided therefor in the key-levers on which they are mounted, which pins take the place of the rearwardly and laterally extending arms above referred to. The pin or arm 31 of each plate projects between two rigid forwardly and downwardly extending jaws 32, formed on the end of a sleeve 33, which is loosely mounted on a rod 34. The opposite or right-hand end of said sleeve has a rigid backwardly-extending arm 35, which projects into the path of the pin 30, the arrangement being such that when the pin strikes the arm it depresses the same and rocks the sleeve, raising the jaws and the pin or arm 31 and tripping the plate 28. The jaws 32 are so spaced that after the plate 28 has been tripped they may return to normal position without disturbing the adjustment. It will be observed that in the former construction referred to the arm of the trip-plate extended toward the right, whereas in the present instance it extends toward the left, and it will also be noted that under the present arrangement with the sleeve 33, with its arm and jaws interposed between the trip-plate and the register-wheel, much less angular movement of the latter is required to trip and set the plate 28 than when the pin 30 acts directly upon the arm thereof. The quick setting of the trip-plates is found in practice to be a desideratum in that it adds materially to the reliability of operation of this part of the machine.

36 is the release-lever, by the depression of which the drawer is unlocked, the bell sounded, and the screen operated to expose an indication. In the former patent referred to this lever is shown and described as being located at the left-hand side of the machine. It is now located at or near the center and is fulcrumed on a transverse rod 37 at the rear and near the bottom of the machine and is formed substantially as shown in Fig. 1. It is normally held up against the shaft 23 by a spring $38^\times$ and its front end extends forward below the range of key-levers $4^a$.

On the shaft 23 at the side of the lever 36 is a cup-shaped disk 38, into which a pin 39 on the lever projects. The rim of this disk or cup has a notch 40 so located that when the shaft stands in normal position it coincides with the pin and permits the latter to pass therethrough, but when the shaft is turned out of normal the notch moves out of coincidence with the pin and the lever is then locked until a full rotation of the shaft and disk have been made. This locking device is shown and described in the former patent referred to and forms no part of the present invention.

41 designates an arm rigidly fixed on a shaft 42, extending across the front of the machine. The rear end of this arm carries a laterally-projecting pin $41^a$, which projects into a notch formed in the lever 36, so that when the latter is depressed it depresses the arm 41 and rocks the shaft 42. The shaft 42 also carries a depending arm 43, which in the normal position of the shaft 42 stands over the front end of a lever 44 and holds the same down. The lever 44 is fulcrumed at the rear of the machine, preferably on the same rod 37 with the release-lever 36. It is thrown upward when released by the arm 43 and is depressed by a cam or projection on the shaft 23 when the latter is rotated, all as shown and described in said prior patent. The lever 44 is connected with and by its movements operates a screen 45 to hide and expose the upper indicators, and it is also connected toward its rear end with a horizontal backwardly-extending arm 46, fast on a rock-shaft 47. A vertical arm 48, also fast on said shaft 47, carries a bell-hammer $48^a$, which when the lever 44 is released, as above described, strikes a bell 49, mounted on the frame-standard. The shank of the bell-hammer is resilient, and the bell is so located with respect to the range of movement of the arm 48 that the hammer completes its stroke by momentum and is withdrawn from the bell by the resiliency of its shank.

50 designates the drawer-latch, in the shape of a vertically-swinging arm, which in its lowered position engages the rear end of the drawer 51 and holds the same closed. This arm is loose on the shaft and drops into locking position by gravity. A short arm 52, fast on shaft 47, has a laterally-projecting pin $52^a$, which underlies the arm 50, the arrangement being such that when the shaft 47 is rocked forward the arm 50 is raised out of engagement with the drawer.

53 designates a sleeve which is loosely mounted on the shaft 47. It has a forwardly-extending arm $53^a$, which projects into the path of movement of a pin $44^a$ on the lever 44, and an oppositely-extending short arm $53^b$. At the side of the arm $53^b$ is a second drawer-latch 54, similar to that marked 50, but slightly longer. This second latch, like the first, has a laterally-projecting pin $54^a$, which overlies the arm $53^b$, so that when the latter is raised by depressing the lever 44, and through it the arm $53^a$, it raises the latch 54 out of engagement with the drawer.

The operation of this part of our invention is as follows: Supposing the machine to have been reset after operation and to be ready for a second operation, the several parts will be in position, as indicated in Fig. 9, the latch 50 will be down in engagement with the drawer, and the latch 54 will be in raised position and out of action. If now the release-lever 36 be operated and the lever 44 released, the latter will be thrown up by its spring, raising the screen 45, rocking the shaft 47 forward through its connection with the arm 46, and causing the hammer to strike the bell. Simultaneously the arm $53^a$ is released, permitting the latch 54 to drop into operative position ready to engage and hold the drawer when the latter is closed. The resetting of the machine preparatory to the next operation restores the parts to the positions shown in Fig. 9, rocking the shaft 47 backward to retract or set the hammer and permit the latch 50 to drop to operative position, at the same time throwing the latch 54 out of action and lowering the screen.

It is stated above that the latch 54 is slightly longer than the latch 50. This is for the purpose of holding the drawer back far enough to permit the latch 50 to drop freely into locking position when the machine is reset.

It will be understood from the foregoing that the two latches 50 54 operate alternately, one being in action when the drawer is closed and the machine reset and the other being in position to engage and hold the drawer while the machine remains unset.

Having now described our invention, we claim—

1. In a machine of the character described, a rotary indicator having a pinion fast thereon, means for imparting step by step the movements to the indicator, a segment-gear in mesh with the pinion, and a spring applied to the segment-gear to actuate the same, said segment operating independently of the step-by-step mechanism.

2. A rotary indicator having a pinion fast at the side thereof, a spring-actuated gear in mesh with said pinion, means for controlling the movements of the indicator under the influence of said gear, and mechanism arranged to operate on the gear to move the same in opposition to its spring to reset the indicator.

3. The combination of a rotary indicator having a pinion connected therewith, a gear loosely mounted on a rock-shaft and meshing with said pinion, a spring for driving the gear in a direction to impart forward movement to the indicator, means for controlling the forward movement of the indicator, an arm on said rock-shaft to engage the gear and turn it in opposition to its spring, and means for rocking the shaft.

4. The combination of a rotary indicator loosely mounted on a rotatable shaft, a gear in mesh with a pinion on the indicator, said gear being loosely mounted on a shaft capable of oscillatory movement, a spring applied to the gear to drive the same, a lever-arm fast on the last-named shaft and a spring applied to said arm to turn the shaft backward, an oppositely-extending arm on the shaft, an arm on the shaft on which the indicator is mounted arranged and adapted to depress and pass the arm on the rock-shaft, and separable connections between the rock-shaft and the gear thereon to engage and turn the same in opposition to its spring.

5. The combination of a rotary indicator having a pinion connected therewith, a spring-actuated gear in mesh with said pinion, means for controlling the forward rotation of the indicator to impart step-by-step movements thereto under the influence of said spring, a rotatable shaft on which the indicator is loosely mounted, a shaft capable of oscillatory movement on which the gear is loosely mounted, a spring applied to said last-named shaft to turn it in one direction, an arm on the shaft to engage the gear and turn it in opposition to its spring, a second arm extending toward the said rotatable shaft, and an arm on the latter adapted to depress and then pass said second arm, as and for the purpose described.

6. The combination of a rotatable shaft, an indicator loosely mounted thereon, a spring-actuated gear for driving the indicator, means for controlling the movements of the indicator, an arm on said rotatable shaft, and devices actuated thereby when the shaft is rotated to move the gear in opposition to its spring.

7. The combination of a rotatable shaft provided with means for rotating the same by hand, an indicator-wheel loosely mounted thereon, mechanism for actuating said indicator-wheel, a second shaft parallel to the first, an alarm mechanism and connections for setting the same from said second shaft, and gearing between said shafts to actuate one from the other.

8. The combination of a rotatable shaft, a spring-pressed lever arranged and adapted to be depressed by a cam or projection on the shaft, a rock-shaft provided with an arm which extends into the path of said lever, a bell-hammer carried by said shaft, means for holding said spring-pressed lever, means for releasing the same, and a bell.

9. The combination of an indicator-wheel having a pinion fast thereon, a rack meshing with the pinion, a spring for actuating the rack, and a manually-operated escapement for effecting step-by-step movements of the indicator under the influence of said spring-actuated rack.

10. The combination with an indicating mechanism of a spring-pressed hand-lever, means for holding the lever and for releasing the same, an oscillating shaft operatively connected with said lever, and a drawer-latch and a bell-hammer both operatively mounted on said shaft, whereby the bell-hammer and the drawer-latch are simultaneously operated by said lever.

11. The combination with an indicating mechanism of a spring-pressed vibrating lever, a movable screen operatively connected with said lever, means for holding the lever against the action of its spring and for releasing the same, an oscillating shaft also operatively connected with said lever, and a drawer-latch and a bell-hammer both operatively mounted on said shaft, whereby the screen, the drawer-latch, and the bell-hammer are simultaneously operated through their connections with a single movable part.

In testimony whereof we affix our signatures in presence of two witnesses.

EDWARD B. HESS.
JOSEPH M. STOUGHTON.

Witnesses:
GEO. H. DODGE,
ANDREW J. SHERIDAN.